United States Patent
Savvides et al.

(10) Patent No.: US 12,182,707 B2
(45) Date of Patent: Dec. 31, 2024

(54) SYSTEM AND METHOD FOR THE DISCOVERING EFFICIENT RANDOM NEURAL NETWORKS

(71) Applicant: CARNEGIE MELLON UNIVERSITY, Pittsburgh, PA (US)

(72) Inventors: Marios Savvides, Pittsburgh, PA (US); Thanh Hai Phan, Pittsburgh, PA (US); Zhiqiang Shen, Pittsburgh, PA (US); Akshay Chawla, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 0 days.

(21) Appl. No.: 18/272,747

(22) PCT Filed: Feb. 18, 2022

(86) PCT No.: PCT/US2022/016903
§ 371 (c)(1),
(2) Date: Jul. 17, 2023

(87) PCT Pub. No.: WO2022/178200
PCT Pub. Date: Aug. 25, 2022

(65) Prior Publication Data
US 2024/0095523 A1    Mar. 21, 2024

Related U.S. Application Data

(60) Provisional application No. 63/150,630, filed on Feb. 18, 2021.

(51) Int. Cl.
*G06N 3/08*    (2023.01)

(52) U.S. Cl.
CPC ..................................... *G06N 3/08* (2013.01)

(58) Field of Classification Search
None
See application file for complete search history.

(56) References Cited

U.S. PATENT DOCUMENTS

2020/0184334 A1    6/2020    Glafkides
2020/0279149 A1    9/2020    Kim

OTHER PUBLICATIONS

Wang, Di, and Mengqi Hu. "Deep deterministic policy gradient with compatible critic network." IEEE Transactions on Neural Networks and Learning Systems 34.8 (2021): 4332-4344. (Year: 2021).*
Pal, Dipan K., Akshay Chawla, and Marios Savvides. "Learning Non-Parametric Invariances from Data with Permanent Random Connectomes." arXiv preprint arXiv:1911.05266 (2019). (Year: 2019).*
International Search Report and Written Opinion for the International Application No. PCT/US22/16903, mailed Jun. 10, 2022, 10 pages.

* cited by examiner

*Primary Examiner* — Daniel T Pellett
(74) *Attorney, Agent, or Firm* — KDW Firm PLLC

(57) ABSTRACT

Disclosed herein is a system and method for novel neural architecture search using a random graph network backbone to facilitate the creation of an efficient network structure. The method utilizes reinforcement learning algorithms to build a complex relationship between intra-connections (i.e., links between blocks in a random graph network) and extra-connections (i.e., links among blocks across the random graphs network) for discovering an efficient random neural architecture.

12 Claims, 3 Drawing Sheets

(a) W/o extra-connections  (b) With extra-connections

Algorithm 1 DDPG algorithm

Randomly initialize critic network $Q(s, a|\theta^Q)$ and actor $\mu(s,|\theta^\mu)$ with weights $\theta^Q$ and $\theta^\mu$.
Initialize target network $Q'$ and $\mu'$ with weights $\theta^{Q'} \leftarrow \theta^Q$, $\theta^{\mu'} \leftarrow \theta^\mu$
Initialize replay buffer $R$
for episode = 1, M do
    Initialize a random process $\mathcal{N}$ for action exploration
    Receive initial observation state $s_1$
    for t = 1, T do
        Select action $a_t = \mu(s_t|\theta^\mu) + \mathcal{N}_t$ according to the current policy and exploration noise
        Execute action $a_t$ and observe reward $r_t$ and observe new state $s_{t+1}$
        Store transition $(s_t, a_t, r_t, s_{t+1})$ in $R$
        Sample a random minibatch of $N$ transitions $(s_i, a_i, r_i, s_{i+1})$ from $R$
        Set $y_i = r_i + \gamma Q'(s_{i+1}, \mu'(s_{i+1})|\theta^{\mu'})|\theta^{Q'})$
        Update critic by minimizing the loss: $L = \frac{1}{N}\sum_i (y_i - Q(s_i, a_i|\theta^Q))^2$
        Update the actor policy using the sampled policy gradient:
$$\nabla_{\theta^\mu} J \approx \frac{1}{N}\sum_i \nabla_a Q(s,a|\theta^Q)|s=s_i, a=\mu(s_i) \nabla_{\theta^\mu} \mu(s|\theta^\mu)|s_i$$
        Update the target networks:
$$\theta^{Q'} \leftarrow \tau\theta^Q + (1-\tau)\theta^{Q'}$$
$$\theta^{\mu'} \leftarrow \tau\theta^\mu + (1-\tau)\theta^{\mu'}$$
    end for
end for

FIG. 3

SYSTEM AND METHOD FOR THE DISCOVERING EFFICIENT RANDOM NEURAL NETWORKS

RELATED APPLICATIONS

This application claims the benefit of U.S. Provisional Patent Application No. 63/150,630, filed Feb. 18, 2021, the contents of which are incorporated herein in their entirety.

BACKGROUND

Manually designing deep neural networks in a trial-and-error, ad hoc fashion is a tedious process requiring both architectural engineering skills and domain expertise. Experts in the design of such networks rely on past experience and technical knowledge to create and design a neural network. Designing novel neural network architectures involves searching over a huge space of hyperparameters concerning the number of layers in the network, the number of filters in each layer, different initializations, normalization techniques etc. Manually creating different configurations of the network architecture spanning different settings under each of the mentioned parameters makes creating novel architectures is difficult and inefficient.

Neural architecture search (NAS) has been successful in replacing the manual design of neural networks with an automatic process that generates optimal network architectures. This automation leads to the discovery of efficient network structures which are searched by optimizing certain metrics such as accuracy and FLOPs. The optimization is challenging because the search space is immense and intractable and relies on initial modules which are manually designed. On the other hand, random graph neural networks have recently achieved significant outcomes by relaxing the constraint of manual architecture designs. However, the approach suffers a low degree of flexibility in exploring effective architectures due to the use of only internal connections within random graphs.

SUMMARY

To address the issue, disclosed herein is a method for novel neural architecture search using a random graph network backbone to facilitate the creation of an efficient network structure. The method utilizes reinforcement learning algorithms to build a complex relationship between intra-connections (i.e., links between nodes in a random graph) and extra-connections (i.e., links among nodes across the graphs) for discovering a tiny yet effective random neural architecture.

BRIEF DESCRIPTION OF THE DRAWINGS

By way of example, a specific exemplary embodiment of the disclosed system and method will now be described, with reference to the accompanying drawings, in which:

FIG. 3 is a meta-language listing of the DDPG algorithm.

DETAILED DESCRIPTION

In graph neural networks, nodes and edges can be considered as inputs/outputs and convolution layers respectively. Graph neural networks with random structures are random graph neural networks. A random graph can be defined by three tractable hyperparameters: (1) a number of nodes (N); (2) an average degree over the graph (k); and (3) a probability that two arbitrary nodes are connected (p).

Figure 1:
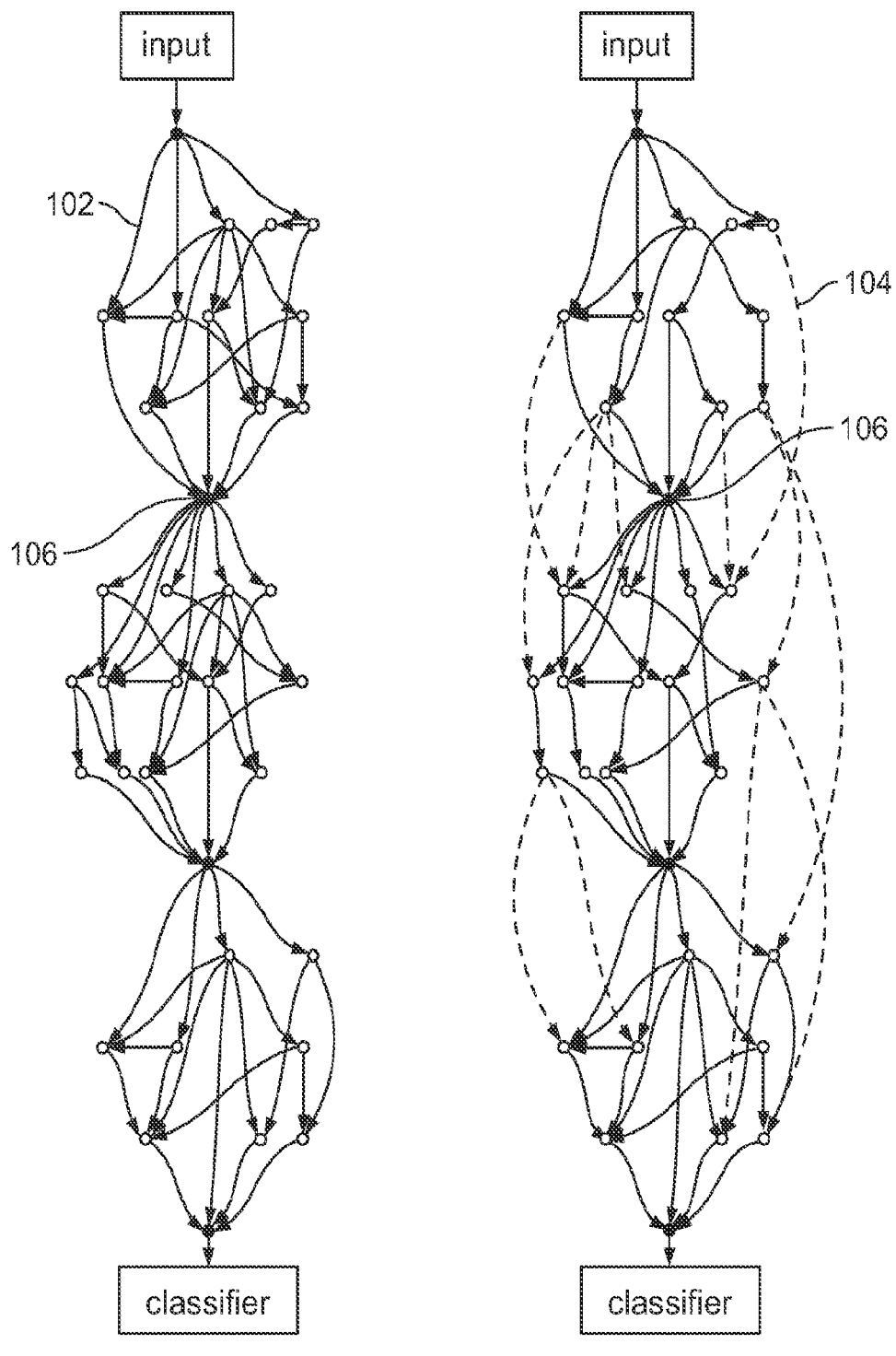
FIG. 1 is an illustration of a three-graph random wired network with and
  without extra-connections.

In the novel method disclosed herein, in a novel random wired neural architecture, a combination of intra- and extra-connections across chained graphs is exploited. FIG. 1 illustrates a three-graph (e.g., a three-block) random wired network with only intra-connections 102 (without the extra-connections) (a) and with the extra (e.g., inter-block) connections 104 (b) shown as dashed lines. Given a FLOP budget, allowing the use of extra-connections 104 across graphs leverages the flexibility in the search for optimal neural network models due to the retention of essential features through network layers.

Properly balancing the ratio of intra-connections 102 to extra-connections 104 in the random wired network graph results in a significant improvement to the random network. The novel method disclosed herein uses a reinforcement learning algorithm based on a deep deterministic policy gradient (DDPG) with a novel setting to leverage the network efficiency due to a mix of intra and extra-connections.

The disclosed method consists of two stages. First, reinforcement learning is used to determine a deep deterministic policy gradient (DDPG) to search for random networks with a proper set of intra-connections 102 and extra-connections 104. Second, a random network explorer is trained from scratch on a visual image classification task to obtain an optimally efficient neural network.

To minimize the manual design of neural architectures, randomly wired networks make use of the structures of classical random graphs. The Watts-Strogatz (WS) structure is recognized as yielding better performance than others. For that reason, the randomly wired networks disclosed herein are based on the WS graph construction. The WS random graph model places nodes on a ring and every node connects to k/2 neighbors. Each random graph takes the output 106 of the preceding blocks as input and averages its internal outputs to the succeeding blocks, as shown in FIG. 1(a). Given the same FLOPs budget, a searching method is disclosed herein to find an architecture whose connections consist of intra-connections 102 (i.e., within a block) and extra-connections 104 (i.e., between blocks) to enhance the network efficiency, thanks to an appropriate retention of essential features through layers as shown in FIG. 1(b).

Figure 2:
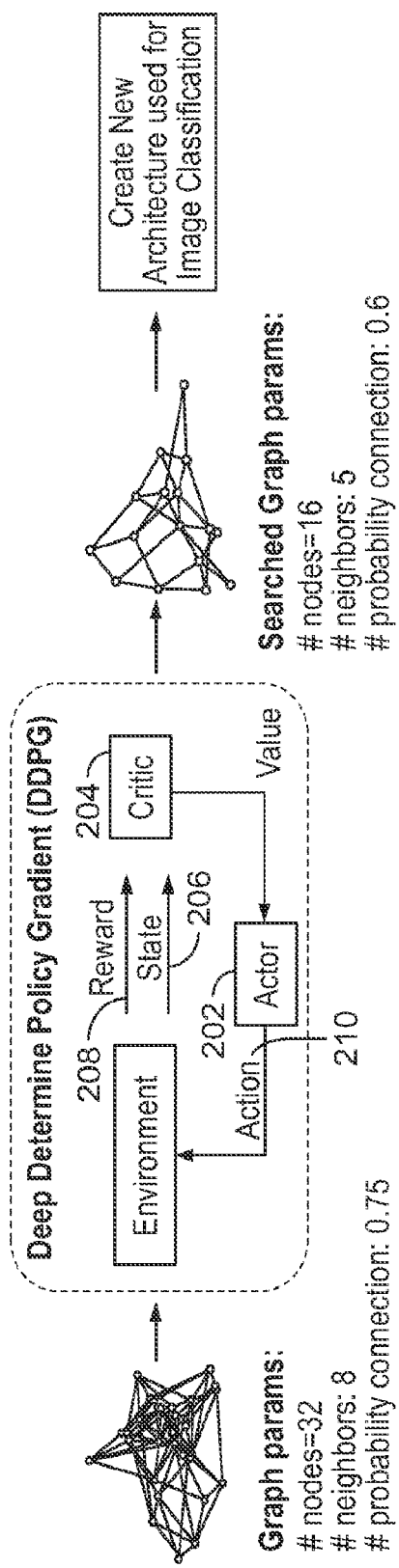
FIG. 2 is a block diagram illustrating the process of training with DDPG to create optimal graph network.

Deep Deterministic Policy Gradient (DDPG)—FIG. 2 is a block diagram showing the process of training with DDPG to create optimal graph networks. DDPG is an actor-critic and model-free algorithm based on a deterministic policy gradient (DPG) which manipulates Deep Q Networks (DQNs) to search in a continuous space of the input. DDPG uses an actor function (e.g., a network) 202: $\mu(s|\theta^\mu)$ to map a state 206 to a corresponding action 210. A critic function (e.g., a network) 204: $Q(s,a)$ acts as the Q-value of the Bellman equation in Q-learning for finding the optimal actions. The Bellman equation is a necessary condition for optimality associated with the dynamic programming mathematical optimization method. It writes the "value" of a decision problem at a certain point in time in terms of the payoff from some initial choices and the "value" of the remaining decision problem that results from those initial choices. This breaks a dynamic optimization problem into a sequence of simpler sub-problems.

$$\nabla_{\theta^\mu} J = E_{s_t \sim \rho^\beta}[\nabla_{\theta^\mu} Q(s,a|\theta^Q)|_{s=s_t, a=\mu(s|\theta^\mu)}] \quad (1)$$

The algorithm implementing the DDPG is shown in FIG. 3.

In the WS model, two main parameters are considered: k and p for intra-connections. A node is connected to k/2 neighbors and two arbitrary nodes are connected with the probability p. The final random neural network graph is a chain of random graph blocks, wherein each block is defined as a state 206 in DDPG. However, to employ extra-connections, two additional parameters are introduced: k' and p'. For a certain state or action, k' and p' are parameters of a random graph whose nodes include itself and subsequent graphs. For example, if a network has four blocks, at state 2, $k'_2$ and $p'_2$ are random graph parameters for nodes in state 2, state 3 and state 4 (or in other words, they are nodes in the $2^{nd}$, $3^{rd}$ and $4^{th}$ blocks). Following this set-up, the randomly wired network construction allows the presence of extra-connections across the graph blocks in a forward manner.

DDPG deploys the actor network 202 and critic network 204 to predict the parameters. Actor function 202 proposes an action given a state. Critic function 204 predicts if the action is good (positive value) or bad (negative value) given the state and the proposed action.

In detail, the action space of intra-extra connections is a=(N, k, p, k', p') and the state space is s=($\mathcal{K}$, N, C, k, p, k', p'), where $\mathcal{K}$ denotes the kernel size of depth-wise convolution (e.g., 3), N is the number of nodes in the block, and C is the number of output channels.

For each state, DDPG predicts the number of nodes and intra- and extra-connections. When reaching the final state, the whole random neural network is constructed and trained for several epochs to compute rewards. The reward function 208 is given as: $\mathcal{R}$=−FLOPs·error that takes into account the error rate of the classification task and the computational FLOPs of the constructed random network. Therefore, an optimal network can be found by maximizing the reward.

The use of extra-connections in randomly wired networks can yield potential outcomes. Disclosed herein is a novel algorithm via architecture search to explore a proper combination of intra and extra-links. The searched networks are efficient as they achieve highly accurate results while saving the computational cost as well as memory storage in dealing with challenging visual classification tasks. Furthermore, the training procedure is affordable because the search process can be done on normal GPUs.

As would be realized by one of skill in the art, the disclosed method described herein can be implemented by a system comprising a processor and memory, storing software that, when executed by the processor, performs the functions comprising the method.

As would further be realized by one of skill in the art, many variations on implementations discussed herein which fall within the scope of the invention are possible. Moreover, it is to be understood that the features of the various embodiments described herein were not mutually exclusive and can exist in various combinations and permutations, even if such combinations or permutations were not made express herein, without departing from the spirit and scope of the invention. Accordingly, the method and apparatus disclosed herein are not to be taken as limitations on the invention but as an illustration thereof. The scope of the invention is defined by the claims which follow.

The invention claimed is:

1. A method for optimizing a graph network representing a neural network comprising:
    training the graph network using a deep deterministic policy gradient, resulting in a chain of random graph blocks, each random graph block defining a state of the neural network;
    wherein the deep deterministic policy gradient defines an actor network to propose an action based on the state, the action comprising parameters defining a number of nodes in each random graph block and both intra-block connections and extra-block connections; and
    wherein the deep deterministic policy gradient defines a critic network that evaluates the proposed actions of the actor function.

2. The method of claim 1 wherein:
    each random graph block comprises a plurality of nodes connected by a plurality of edges;
    intra-block connections define connections between nodes in a single block; and
    extra-block connections define connections between nodes in different blocks.

3. The method of claim 2 wherein the parameters defining the intra-block connections comprise:
    k, an average degree over the block; and
    p, a probability that two arbitrary nodes in the block are connected.

4. The method of claim 3 wherein the parameters defining extra-block connections define extra-block connections for the current block and each subsequent block in the graph network.

5. The method of claim 2 wherein the parameters defining the intra-block and extra-block connections comprise:
    k', an average degree over the block and each subsequent block in the graph; and
    p', a probability that an arbitrary node in one block is connected to an arbitrary node in a subsequent block.

6. The method of claim 5 wherein each node in a block is connected to k/2 other nodes.

7. The method of claim 6 wherein an action space of the actor function is defined as: a=(N, k, p, k', p');
    wherein:
    N is the number of nodes in the block.

8. The method of claim 7 wherein a state space of the graph network is defined as: s=($\mathcal{K}$, N, C, k, p, k', p');
    wherein:
    $\mathcal{K}$ denotes a kernel size of a depth-wise convolution; and
    C is a number of output channels.

9. The method of claim 1 wherein the final state of the graph network is achieved when a loss of the critic network is minimized.

10. The method of claim 9 wherein, when the final status graph network is been achieved, implementing the neural network based on the final state of the graph network.

11. A system comprising:
    a processor; and
    memory, storing software that, when executed by a processor, implements the method of claim 1.

12. A system comprising:
    a processor; and
    memory, storing software that, when executed by a processor, implements the method of claim 10.

* * * * *